(12) United States Patent
Chan et al.

(10) Patent No.: US 7,729,139 B2
(45) Date of Patent: Jun. 1, 2010

(54) CURRENT SOURCE INVERTER WITH ENERGY CLAMP CIRCUIT AND CONTROLLING METHOD THEREOF HAVING RELATIVELY BETTER EFFECTIVENESS

(75) Inventors: Chih-Chiang Chan, Taoyuan Hsien (TW); Yu-Ming Chang, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 403 days.

(21) Appl. No.: 11/726,950

(22) Filed: Mar. 23, 2007

(65) Prior Publication Data
US 2007/0230220 A1 Oct. 4, 2007

(30) Foreign Application Priority Data
Mar. 31, 2006 (TW) .............................. 95111692 A

(51) Int. Cl.
*H02M 1/12* (2006.01)
(52) U.S. Cl. ...................................... 363/40
(58) Field of Classification Search .................. 363/16, 363/39, 40, 55
See application file for complete search history.

(56) References Cited

U.S. PATENT DOCUMENTS 5,488,554 A * 1/1996 Green .......................... 363/25
2004/0119432 A1 6/2004 Youm

FOREIGN PATENT DOCUMENTS

JP 5056657 A 3/1993

* cited by examiner

*Primary Examiner*—Adolf Berhane
(74) *Attorney, Agent, or Firm*—Volpe and Koenig, P.C.

(57) ABSTRACT

The provided current source inverter includes a buck converter having an input capacitor and an output inductor, receiving a DC input voltage, and generating an output inductor current, a DC/AC converter having an output capacitor, receiving the output inductor current and generating an AC output voltage, a load coupled to the DC/AC converter, and an energy clamp circuit coupled to the buck and the DC/AC converters. The energy clamp circuit includes a first diode and a second diode, provides a discharging route while the load is disconnected with the output capacitor such that the electrical power stored at the output inductor could be discharged to the output capacitor and the input capacitor and avoids an inrush current.

16 Claims, 14 Drawing Sheets

CURRENT SOURCE INVERTER WITH ENERGY CLAMP CIRCUIT AND CONTROLLING METHOD THEREOF HAVING RELATIVELY BETTER EFFECTIVENESS

FIELD OF THE INVENTION

The present invention relates to a current source inverter and its controlling method. More particularly, the present invention relates to a current source inverter including an energy clamp circuit and its controlling method having a relatively better effectiveness.

BACKGROUND OF THE INVENTION

Please refer to FIG. 1, it is a schematic circuit diagram of a conventional current source inverter 1, which has a current source output $I\_o$, and can be electrically connected to a utility power (Utility) in parallel. In FIG. 1, the current source inverter 1 includes a buck converter 11 and a DC/AC converter 12. The buck converter 11 includes an input capacitor $C\_in$, a buck converter switch $S\_buck$, a free-wheeling diode $D\_buck$ and a output inductor $L\_o$ receiving a DC input voltage $V\_in$ and generating an output inductor current $I\_Lo$. The DC/AC converter 12 includes a full bridge switching circuit 121, which includes four unidirectional switches and an output capacitor $C\_o$. The four unidirectional switches are D1+Q1, D2+Q2, D3+Q3 and D4+Q4. In which, D1, D2, D3 and D4 are rectifying diodes, and Q1, Q2, Q3 and Q4 are power transistors, e.g., MOSFETs, IGBTs and bipolar transistors. An electrical power stored in the output inductor $L\_o$ is discharged to the output capacitor $C\_o$ when the output capacitor $C\_o$ is separated from the utility power (Utility), which will cause an AC output voltage $V\_o$ of the current source inverter 1 to be higher than the rated AC output voltage, and transistors having relatively higher tolerated voltage are required to avoid the damage of the power transistors Q1-Q4.

Referring to FIG. 1, an important function of the buck converter 11 is to cause a power factor of the current source inverter 1 to be one, which is resulting from that the output inductor current $I\_Lo$ would have one of an increase and a decrease following a variation of the waveform of the AC output voltage $V\_o$ of the current source inverter 1, and have a rectified sinusoidal waveform (see $I\_Lo$ as shown in FIG. 1) achieved via changing the duty cycle of the buck converter switch $S\_buck$. The DC/AC converter 12 is employed to convert the rectified sinusoidal waveform of the output inductor current $I\_Lo$ into an AC sinusoidal waveform of an AC output current $I\_o$ (see FIG. 1).

Since the current flowing through the output inductor $L\_o$, $I\_Lo$, would vary according to the waveform of the AC output voltage $V\_o$ and have the rectified sinusoidal waveform when the current source inverter 1 is under operation, and generally speaking, the output inductor $L\_o$ has a relatively larger inductance, the buck converter 11 of FIG. 1 is equivalent to a current source 11 as shown in FIG. 2(a), which shows an equivalent circuit diagram of the conventional current source inverter 1 of FIG. 1 and a discharging route of the output inductor $L\_o$ when the utility power (Utility) is disconnected with the current source inverter 1, while the AC output voltage $V\_o$ is at a positive half-cycle.

Please refer to FIG. 2(a), the transistors Q1 and Q4 are conductive, the output inductor current $I\_Lo$ flows through the diodes D1 and D4, and the transistors Q1 and Q4 feedback an electrical power to the utility power (Utility) when the utility power (Utility) is connected with the current source inverter 1, while the AC output voltage is at the positive half-cycle. If the utility power (Utility) is disconnected with the current source inverter 1 at this moment (a socket 123 connected to and providing the utility power is separated from a plug 122), an electrical power stored in the output inductor $L\_o$ is discharged to the output capacitor $C\_o$ such that the AC output voltage $V\_o$ and the voltage $V\_1$ across the transistor Q2 and the diode D2 are both increased. Similarly, the transistors Q2 and Q3 are conductive, the output inductor current $I\_Lo$ flows through the diodes D2 and D3, and the transistors Q2 and Q3 feedback an electrical power to the utility power (Utility) when the utility power (Utility) is connected with the current source inverter 1, while the AC output voltage $V\_o$ is at a negative half-cycle. If the utility power (Utility) is disconnected with the current source inverter 1 at this moment (the plug 122 is separated from the socket 123), the electrical power stored in the output inductor $L\_o$ is discharged to the output capacitor $C\_o$ such that the AC output voltage $V\_o$ and the voltage $V\_2$ across the transistor Q4 and the diode D4 are both increased as shown in FIG. 2(b), which shows the equivalent circuit diagram of the conventional current source inverter 1 of FIG. 1 and a discharging route of the output inductor $L\_o$ when the utility power (Utility) is disconnected with the current source inverter 1, and the AC output voltage $V\_o$ is at the negative half-cycle. Due to the relatively higher voltages of $V\_1$, $V\_2$ and $V\_o$, transistors having relatively higher tolerated voltage are required to avoid the damage of the power transistors Q1-Q4, and the manufacturing costs of which are increased, thus an improvement is needed.

Referring to FIG. 3(a), it is a schematic circuit diagram of a conventional current source inverter 2, which includes the buck converter 11, the DC/AC converter 12 having the full bridge switching circuit 121 (as shown in FIGS. 1, and 2(a)-2(b)) and an energy clamp circuit 21 having the first to the fourth diodes $D\_A$, $D\_B$, $D\_C$ and $D\_D$. Due to that the DC input voltage $V\_in$ is larger than the peak value of the AC output voltage $V\_o$ when the current source inverter 2 is under a normal operation, the four diodes $D\_A$, $D\_B$, $D\_C$ and $D\_D$ are turned off. When the utility power (Utility) is disconnected with the current source inverter 2, the electrical power stored in the output inductor $L\_o$ would be feedbacked to the output capacitor $C\_o$ and the input capacitor $C\_in$ via one of the diodes $D\_A$ and $D\_D$, and the diodes $D\_B$ and $D\_C$. That is to say, the output inductor $L\_o$ discharges the stored electrical power to the output capacitor $C\_o$ and the input capacitor $C\_in$ when the utility power (Utility) is disconnected with the current source inverter 2. When the AC output voltage $V\_o$ is increased to a value such that the voltage across the output capacitor $C\_o$ is a little bit larger than the DC input voltage $V\_in$, the diodes $D\_A$, $D\_B$, $D\_C$ and $D\_D$ are turned on, and the electrical power stored in the output inductor $L\_o$ is feedbacked to the terminals of the DC input power supply $V\_in$ (i.e. $C\_in$). Thus, the AC output voltage $V\_o$ would be clamped at a level that is a little bit larger than that of the DC input voltage $V\_in$ such that voltage stresses of the transistors Q1 to Q4 could be decreased dramatically.

In FIG. 3(b), the transistors Q1 and Q4 are conductive, the output inductor current $I\_Lo$ flows through the diodes D1 and D4, and the transistors Q1 and Q4 feedback the electrical power stored in the output inductor $L\_o$ to the utility power (Utility) when the AC output voltage $V\_o$ of the utility power (Utility) is at the positive half-cycle. If the AC output voltage $V\_o$ of the utility power (Utility) is disconnected with the current source inverter 2 (the plug 122 is separated from the socket 123) at this moment, the electrical power stored in the output inductor $L\_o$ would be discharged to the output capacitor C_o and the input capacitor C_in via a positive half-cycle discharging route, i.e. the current route as shown in FIG. 3(b) (the output inductor L_o→the diode D1→the transistor Q1→the diode D_A→the input capacitor C_in→the diode D_D→the diode D4→the transistor Q4→the free-wheeling diode D_buck→the output inductor L_o).

Furthermore, referring to FIG. 3(c), the transistors Q2 and Q3 are conductive, the output inductor current I_Lo flows through the diodes D2 and D3, and the transistors Q2 and Q3 feedback the electrical power stored in the output inductor L_o to the utility power (Utility) when the AC output voltage V_o of the utility power (Utility) is at the negative half-cycle. If the AC output voltage V_o of the utility power (Utility) is disconnected with the current source inverter 2 (the plug 122 is separated from the socket 123) at this moment, the electrical power stored in the output inductor L_o would be discharged to the output capacitor C_o and the input capacitor C_in via a negative half-cycle discharging route, i.e. the current route as shown in FIG. 3(c) (the output inductor L_o→the diode D3→the transistor Q3→the diode D_B→the input capacitor C_in→the diode D_C→the diode D2→the transistor Q2→the free-wheeling diode D_buck→the output inductor L_o).

If the utility power (Utility) is connected to the current source inverter 2 of FIG. 3(a) when the DC input power supply V_in is not built up yet, a relatively large inrush current would be generated and flows through one of the diodes D_A and D_B, and the diodes D_C and D_D to the input capacitor C_in, the inrush current might burn down the fuse at the utility power (Utility) side, and would easily cause the interference of harmonic waves. The inrush current is generated flows through a positive half-cycle route (utility power→the first terminal of output capacitor C_o→diode D_A→input capacitor C_in→diode D_D→the second terminal of output capacitor C_o→utility power) as shown in FIG. 4(a) when the utility power (Utility) is connected with the current source inverter 2, the DC input voltage V_in is at one of the states being zero and being less than a peak value of the AC output voltage V_o of the utility power (Utility), and the AC output voltage V_o is at the positive half-cycle.

By the same token, the inrush current is generated and flows through a negative half-cycle route (utility power→the second terminal of output capacitor C_o→diode D_B→input capacitor C_in→diode D_C→the first terminal of output capacitor C_o→utility power) as shown in FIG. 4(b) when the utility power (Utility) is connected with the current source inverter 2, the DC input voltage V_in is at one of the states being zero and being less than a peak value of the AC output voltage V_o of the utility power (Utility), while the AC output voltage V_o is at the negative half-cycle.

Keeping the drawbacks of the prior arts in mind, and employing experiments and research full-heartily and persistently, the applicants finally conceived the current source inverter with the energy clamp circuit and the controlling method thereof having the relatively better effectiveness.

SUMMARY OF THE INVENTION

It is therefore an object of the present invention to provide a current source inverter with an energy clamp circuit and a controlling method thereof having a relatively better effectiveness such that when an AC output voltage of an utility power is disconnected with the current source inverter, the electrical power stored in an output inductor of the current source inverter would be discharged to an output capacitor and an input capacitor of the current source inverter via the energy clamp circuit so as to decrease the voltage stresses of a plurality of transistors of the current source inverter dramatically, and to avoid the inrush current when the utility power is connected with the current source inverter, a DC input voltage of the current source inverter is at one of the states being zero and being less than a peak value of the AC output voltage of the utility power.

According to the first aspect of the present invention, the current source inverter feedbacks an AC output current to an independent power supply having a load, provides an electrical power to the load, and includes a buck converter receiving a DC input voltage and generating an inductor current having a rectified sinusoidal waveform, a DC/AC converter coupled to the buck converter, receiving the inductor current and providing the AC output current and an energy clamp circuit coupled to the buck converter and the DC/AC converter, and including: a plurality of diodes coupled to the buck converter and the DC/AC converter and a first switch coupled to one of the buck converter and the DC/AC converter for eliminating an inrush current at one of the states that the DC input voltage is not built up yet and the DC input voltage is less than a peak value of an AC output voltage of the independent power supply, while the current source inverter is electrically connected to the independent power supply.

Preferably, the plurality of diodes include a first to a fourth diodes, and the buck converter includes an input capacitor having a first and a second terminals, an output inductor having a first and a second terminals, a second switch having a first terminal coupled to the first terminal of the input capacitor, a second terminal and a control terminal and a fifth diode having an anode coupled to the second terminal of the input capacitor and a cathode coupled to the second terminal of the second switch and the first terminal of the output inductor, in which the inductor current is converted into the AC output current via the DC/AC converter coupled to the second terminal of the output inductor and including an output capacitor having a first and a second terminals and electrically connected to the independent power supply in parallel and a full bridge switching circuit having a first input terminal coupled to the second terminal of the output inductor, a second input terminal coupled to the anode of the fifth diode, a first output terminal coupled to the first terminal of the output capacitor and a second output terminal coupled to the second output terminal of the output capacitor for generating the AC output current, and further including a third switch having a first terminal coupled to the first input terminal of the full bridge switching circuit and a second terminal coupled to the first output terminal of the full bridge switching circuit, a fourth switch having a first terminal coupled to the first output terminal of the full bridge switching circuit and a second terminal coupled to the second input terminal of the full bridge switching circuit, a fifth switch having a first terminal coupled to the first terminal of the third switch and a second terminal coupled to the second output terminal of the full bridge switching circuit and a sixth switch having a first terminal coupled to the second output terminal of the full bridge switching circuit and a second terminal coupled to the second terminal of the fourth switch, in which the energy clamp circuit provides a discharging route when the output capacitor is separated from the independent power supply such that an electrical energy stored in the output inductor is discharging to the output and the input capacitors to decrease a voltage stress of the DC/AC converter, the first to the fourth diodes form the discharging route, each of the first to the fourth diodes has an anode and a cathode, the anode of the first diode is coupled to the first terminal of the output capacitor, the cathode of the first diode is coupled to the first terminal of the input capacitor, the anode of the second diode is coupled to the second terminal of the output capacitor, the cathode of the second diode is coupled to the cathode of the first diode, the anode of the third diode is coupled to the second terminal of the input capacitor, the cathode of the third diode is coupled to the anode of the first diode, the anode of the fourth diode is coupled to the anode of the third diode, and the cathode of the fourth diode is coupled to the anode of the second diode.

Preferably, the fifth diode is a free-wheeling diode, the second switch is a buck converter switch, and the third to the sixth switches are a first to a fourth unidirectional switches each having a first and a second ends, and further including a rectifying diode having an anode coupled to the first end and a cathode and a power transistor having a first terminal coupled to the cathode of the rectifying diode, a second terminal coupled to the second end and a control terminal, in which the voltage stress is a voltage stress of the power transistor, and the power transistor is one selected from a group consisting of a MOSFET, an IGBT, and a bipolar transistor.

Preferably, the first switch is electrically connected to two terminals, which is one set selected from a set group consisting of the cathode of the third diode and the first terminal of the output capacitor, the cathode of the first diode and the first terminal of the input capacitor, and the anode of the third diode and the second terminal of the input capacitor, in series.

Preferably, the independent power supply is one selected from a group consisting of a utility power, a generator and an UPS, the independent power supply has a first terminal and a second terminal, a route of the inrush current includes a positive half-cycle route and a negative half-cycle route, the positive half-cycle route includes the first terminal of the independent power supply, the first terminal of the output capacitor, the first diode, the input capacitor, the fourth diode, the second terminal of the output capacitor and the second terminal of the independent power supply so as to form a first loop when the AC output voltage is at a positive half-cycle, the negative half-cycle route includes the second terminal of the independent power supply, the second terminal of the output capacitor, the second diode, the input capacitor, the third diode, the first terminal of the output capacitor and the first terminal of the independent power supply so as to form a second loop when the AC output voltage is at a negative half-cycle, and the first switch is turned off to disconnect one of the first loop and the second loop so as to eliminate the inrush current.

Preferably, the discharging route includes a positive half-cycle discharging route and a negative half-cycle discharging route, the positive half-cycle discharging route includes the output inductor, the third switch, the first diode, the input capacitor, the fourth diode, the sixth switch and the fifth diode to form a first loop, the negative half-cycle discharging route includes the output inductor, the fifth switch, the second diode, the input capacitor, the third diode, the fourth switch and the fifth diode to form a second loop, the electrical power stored in the output inductor is discharged to the input capacitor via the first loop when the output capacitor and the independent power supply are separated at a positive half-cycle of the AC output voltage, the electrical energy stored in the output inductor is discharged to the input capacitor via the second loop when the output capacitor and the independent power supply are separated at a negative half-cycle of the AC output voltage, and the independent power supply belongs to one of the two states, being that the power supply is connected to and separated from the output capacitor via causing one of a connection and a separation of a socket coupled to the power supply and a plug respectively.

Preferably, the output inductor current would have a sinusoidal waveshape in phase with the output AC line voltage such that a power factor of the current source inverter is one.

According to the second aspect of the present invention, the current source inverter feedbacks an AC output current to an independent power supply having a load, provides an electrical power to the load, and includes a buck converter receiving a DC input voltage and generating a inductor current having a rectified sinusoidal waveform, a DC/AC converter coupled to the buck converter, receiving the inductor current and providing the AC output current and an energy clamp circuit coupled to the buck converter and the DC/AC converter for eliminating an inrush current at one of the states that the DC input voltage is not built up yet and the DC input voltage is less than a peak value of an AC output voltage of the independent power supply, while the current source inverter is electrically connected to the independent power supply, and including a first diode coupled to the buck converter and the DC/AC converter and a second diode coupled to the first diode.

Preferably, the energy clamping circuit provides a discharging route when the output capacitor is separated from the independent power supply such that an electrical energy stored in the output inductor is discharging to the output and the input capacitors to decrease a voltage stress of the DC/AC converter, the first and the second diodes form a discharging route, each of the first and the second diodes has an anode and a cathode, the anode of the first diode is coupled to the second terminal of the output capacitor, the cathode of the first diode is coupled to the first terminal of the input capacitor, the anode of the second diode is coupled to the first terminal of the output capacitor, the cathode of the second diode is coupled to the cathode of the first diode, and the inrush current is not generated by the current source inverter at one of the states that the DC input voltage is not built up yet and the DC input voltage is less than a peak value of the AC output voltage of the independent power supply, while the current source inverter is electrically connected to the independent power supply since the first to the fourth unidirectional switches are not turned on.

Preferably, the discharging route includes a positive half-cycle discharging route and a negative half-cycle discharging route, the positive half-cycle discharging route includes the output inductor, the first unidirectional switch, the second diode, the input capacitor and the free-wheeling diode to form a first loop, the negative half-cycle discharging route includes the output inductor, the third unidirectional switch, the first diode, the input capacitor and the free-wheeling diode to form a second loop, the electrical power stored in the output inductor is discharged to the input capacitor via the first loop when the load is disconnected with the output capacitor at a positive half-cycle of the AC output voltage, and the electrical energy stored in the output inductor is discharged to the input capacitor via the second loop when the load is disconnected with the output capacitor at a negative half-cycle of the AC output voltage.

According to the third aspect of the present invention, the controlling method of a current source inverter, in which the current source inverter includes an input capacitor, an output inductor, an output capacitor electrically connected in parallel to an independent power supply having a load, and an energy clamp circuit coupled to the input and the output capacitors, includes the steps of: (a) causing the current source inverter to receive a DC input voltage and to generate an inductor current having a rectified sinusoidal waveform; (b) causing the current source inverter to receive the inductor current, feedback an AC output current to the independent power supply and provide an electrical power to the load; (c) causing the energy clamp circuit to provide a discharging route when the output capacitor is separated from the independent power supply such that the electrical energy stored in the output inductor is discharging to the output and the input capacitors to decrease a voltage stress of the current source inverter; and (d) causing the energy clamp circuit to eliminate an inrush current at one of the states that the DC input voltage is not built up yet and the DC input voltage is less than a peak value of an AC output voltage of the independent power supply, while the current source inverter is electrically connected to the independent power supply.

According to the fourth aspect of the present invention, the current source inverter includes a main circuit receiving a DC input voltage and providing an AC output current and an energy clamp circuit coupled to the main circuit and including a plurality of diodes coupled to the main circuit and a first switch coupled to the main circuit for eliminating an inrush current at one of the states that the DC input voltage is not built up yet and the DC input voltage is less than a peak value of an AC output voltage of an independent power supply.

Preferably, the current source inverter feedbacks the AC output current to the independent power supply having a load and provides an electrical power to the load, and the first switch eliminates the inrush current while the current source inverter is electrically connected to the independent power supply, and the main circuit includes a buck and a DC/AC converters.

According to the fifth aspect of the present invention, an energy clamp circuit adapted to a main circuit to form a current source inverter includes a plurality of diodes coupled to the main circuit and a first switch coupled to the main circuit for eliminating an inrush current at one of the states that a DC input voltage is not built up yet and the DC input voltage is less than a peak value of an AC output voltage of an independent power supply.

Preferably, the energy clamp circuit further includes a main circuit to form a current source inverter.

According to the sixth aspect of the present invention, the current source inverter includes a main circuit receiving a DC input voltage and providing an AC output current and an energy clamp circuit coupled to the main circuit and including a first diode coupled to the main circuit and a second diode coupled to the first diode for eliminating an inrush current at one of the states that the DC input voltage is not built up yet and the DC input voltage is less than a peak value of an AC output voltage of an independent power supply.

Preferably, the current source inverter feedbacks the AC output current to the independent power supply having a load and provides an electrical power to the load, the main circuit includes a buck and a DC/AC converters and the first switch eliminates the inrush current while the current source inverter is electrically connected to the independent power supply.

According to the seventh aspect of the present invention, an energy clamp circuit adapted to a main circuit to form a current source inverter and eliminating an inrush current at one of the states that a DC input voltage is not built up yet and the DC input voltage is less than a peak value of an AC output voltage of an independent power supply includes a first p-n junction coupled to the main circuit and a second p-n junction coupled to the first p-n junction.

Preferably, the energy clamp circuit further includes a main circuit to form a current source inverter, in which the first and the second p-n junctions are a first and a second diodes.

The present invention may best be understood through the following descriptions with reference to the accompanying drawings, in which:

DETAILED DESCRIPTION OF THE PREFERRED EMBODIMENT

Figure 5A:
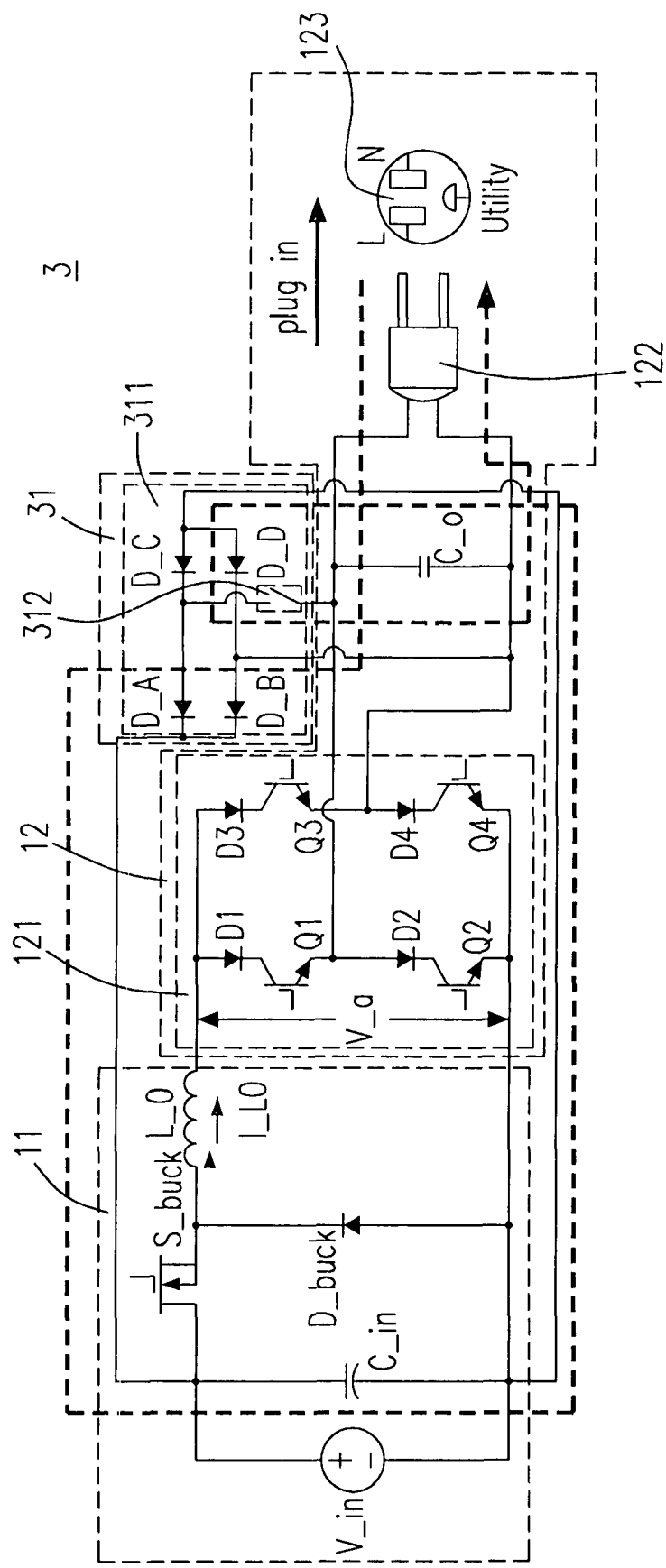
FIG. 5(a) shows a schematic circuit diagram of a current source inverter including an energy clamp circuit having a relatively better effectiveness according to the first preferred embodiment of the present invention and a potential inrush current route when the utility power is connected with the current source inverter, while the AC output voltage is at a positive half-cycle.

Please refer to FIG. 5(a), it shows a schematic circuit diagram of a current source inverter including an energy clamp circuit having a relatively better effectiveness according to the first preferred embodiment of the present invention and a potential inrush current route when the utility power is connected with the current source inverter, and the AC output voltage is at a positive half-cycle. In which, the current source inverter 3 includes the buck converter 11, the DC/AC converter 12 having the full bridge switching circuit 121, a plug 122 and a socket 123 (for providing the utility power), which are the same as those of FIGS. 3(a)-3(c), and an energy clamp circuit 31 having a plurality of diodes 311 (the first to the fourth diodes D_A, D_B, D_C and D_D, which are the same as those of 21 in FIG. 3(a)) and a switch 312.

Figure 4A:
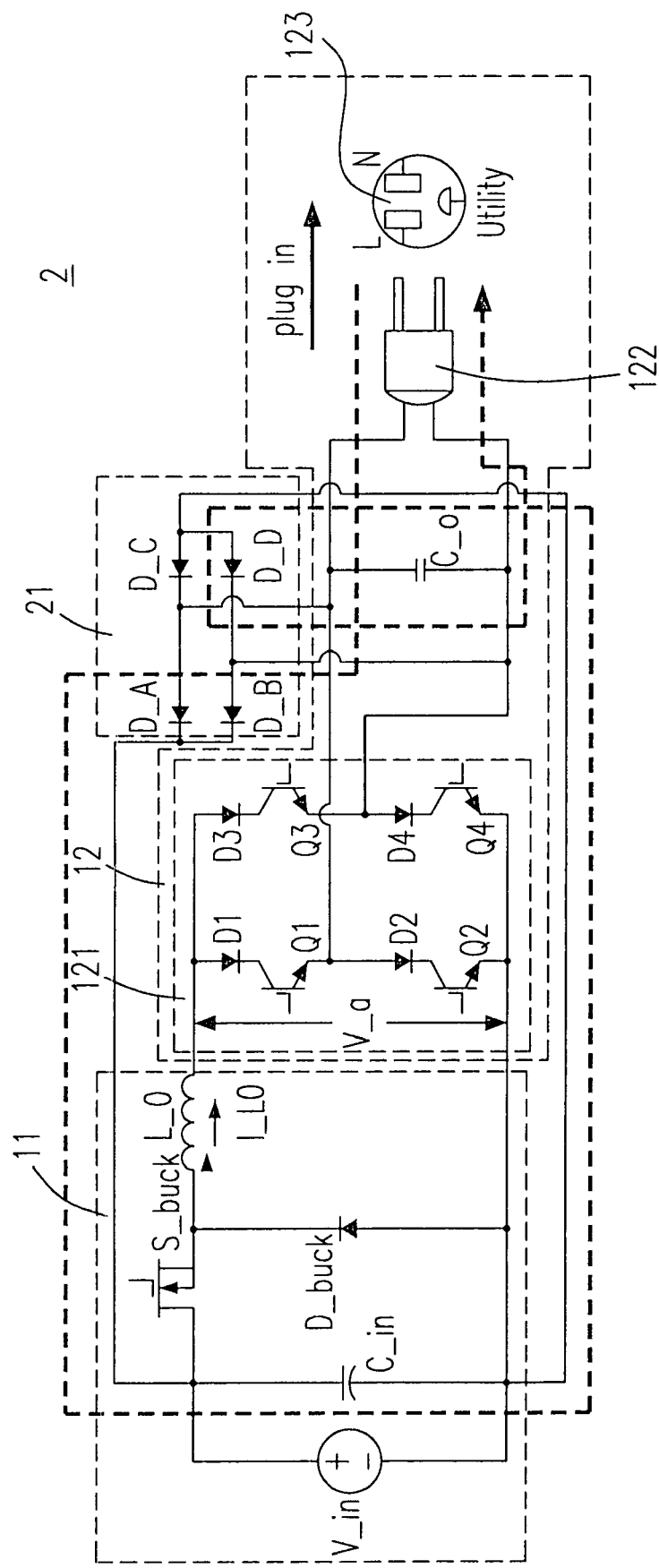
FIG. 4(a) shows a schematic circuit diagram of a conventional current source inverter having an energy clamp circuit and an inrush current route when the utility power is connected with the current source inverter, and the DC input voltage is zero, while the AC output voltage is at a positive half-cycle.

The positive half-cycle inrush current route as shown in FIG. 5(a) is the same as the inrush current route of FIG. 4(a), which is employed to indicate the possible route of the inrush current only if the switch 312 is not turned off timely. The switch 312 is electrically connected to the cathode of the third diode D_C and the first terminal of the output capacitor C_o in series, and is turned off when the utility power (Utility) is connected with the current source inverter 3, the DC input voltage V_in is at one of the states being zero and being less than a peak value of the AC output voltage V_o of the utility power (Utility), while the AC output voltage is at the positive half-cycle. Since the switch 312 is located at the route possibly flowing through by the inrush current, turning off the switch 312 timely would totally eliminate the inrush current.

Figure 1:
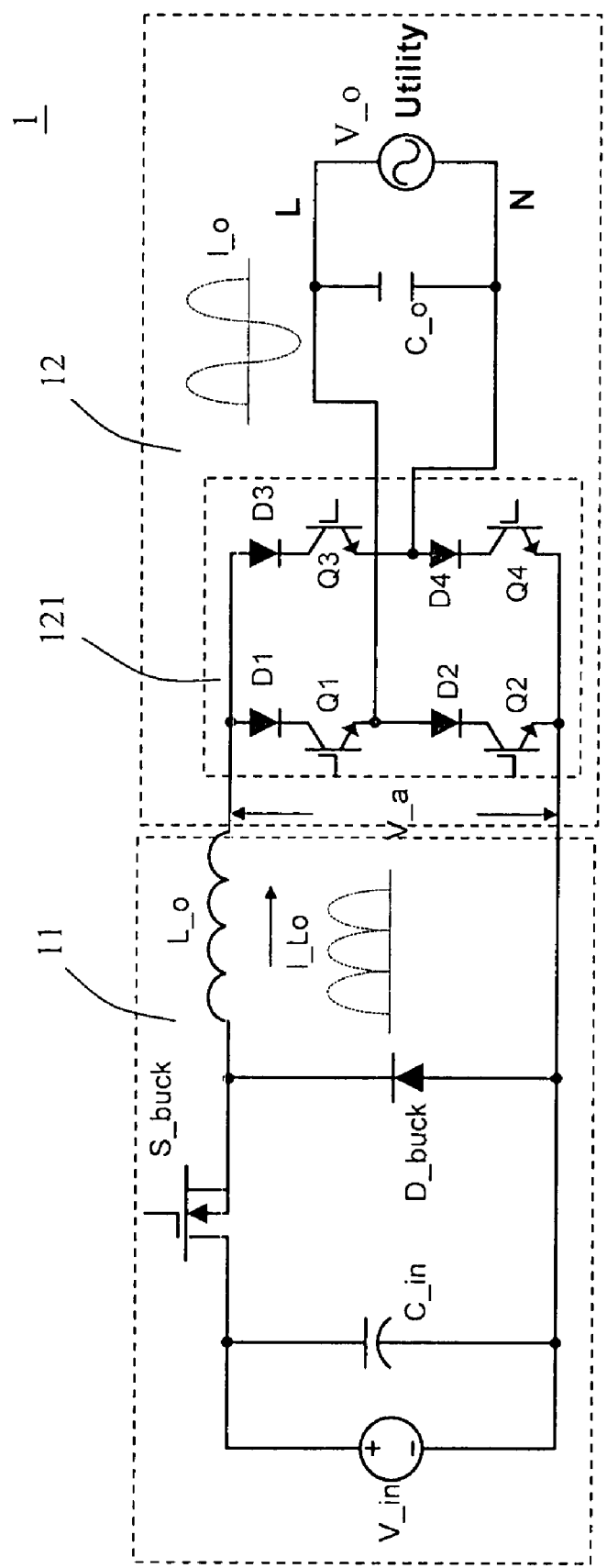
FIG. 1 is a schematic circuit diagram of a conventional current source inverter.
Figure 2A:
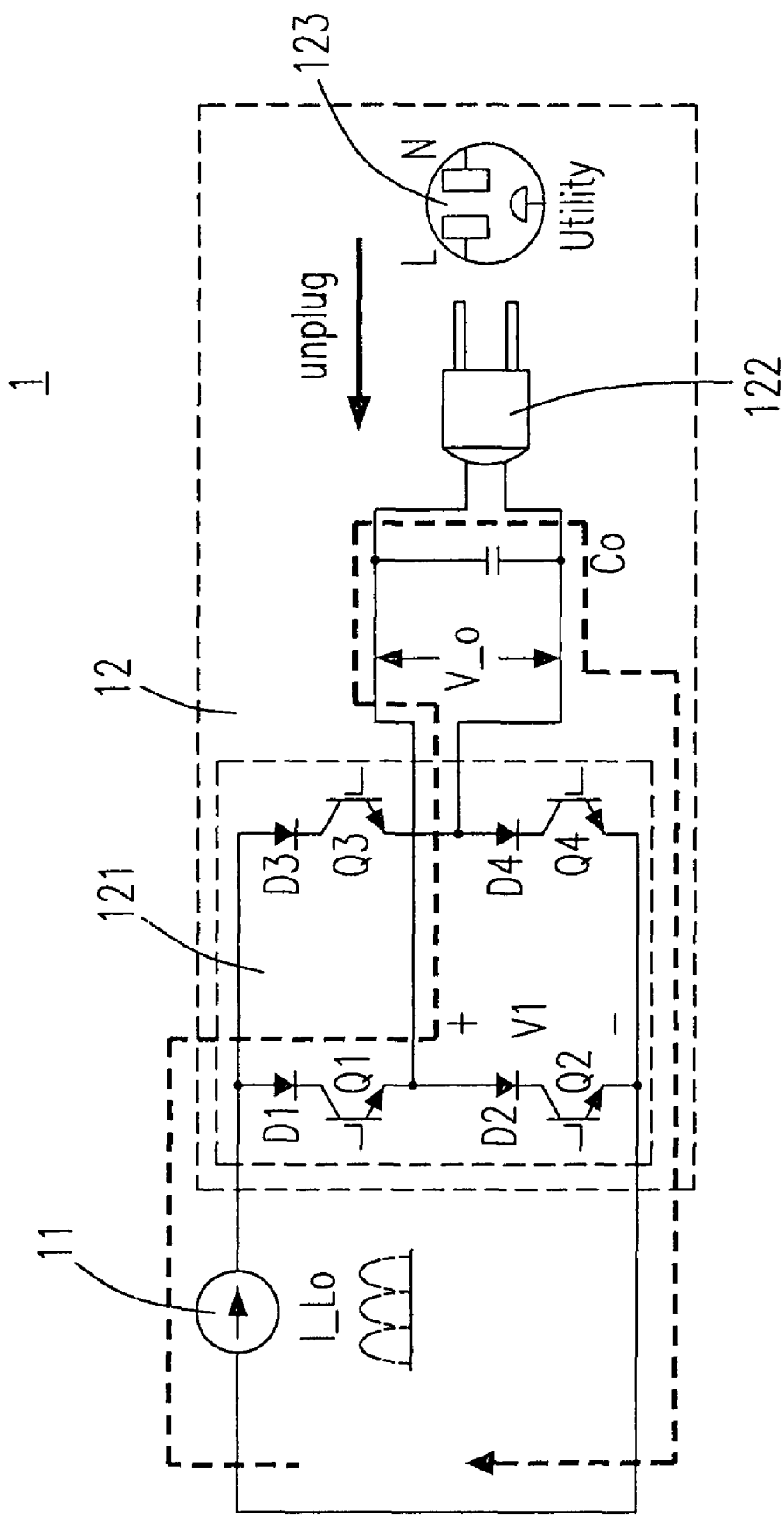
FIG. 2(a) shows an equivalent circuit diagram of the conventional current source inverter of FIG. 1 and a discharging route of the output inductor when the utility power is disconnected with the current source inverter, and the AC output voltage is at a positive half-cycle.
Figure 2B:
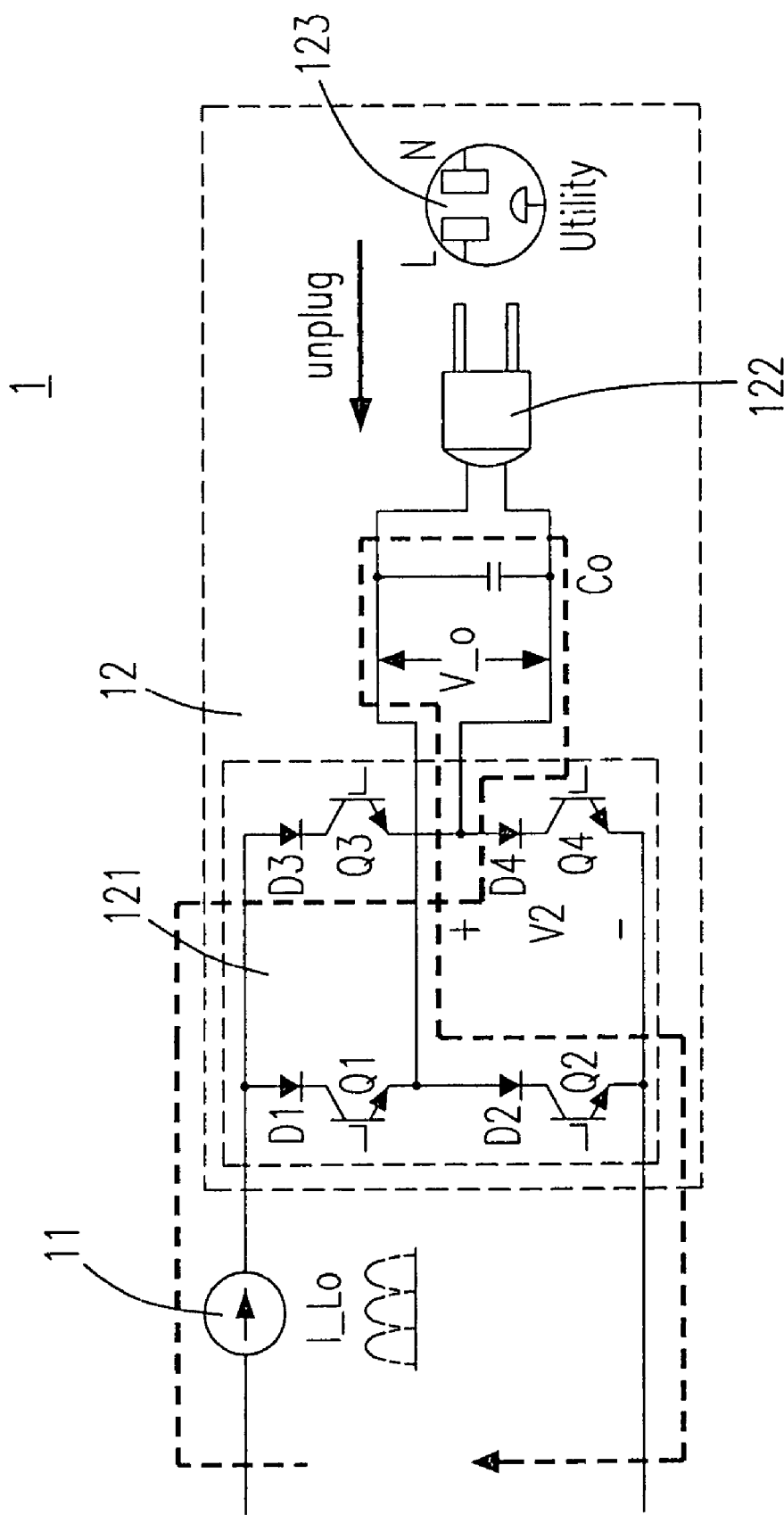
FIG. 2(b) shows an equivalent circuit diagram of the conventional current source inverter of FIG. 1 and a discharging route of the output inductor when the utility power is disconnected with the current source inverter, and the AC output voltage is at a negative half-cycle.
Figure 3A:
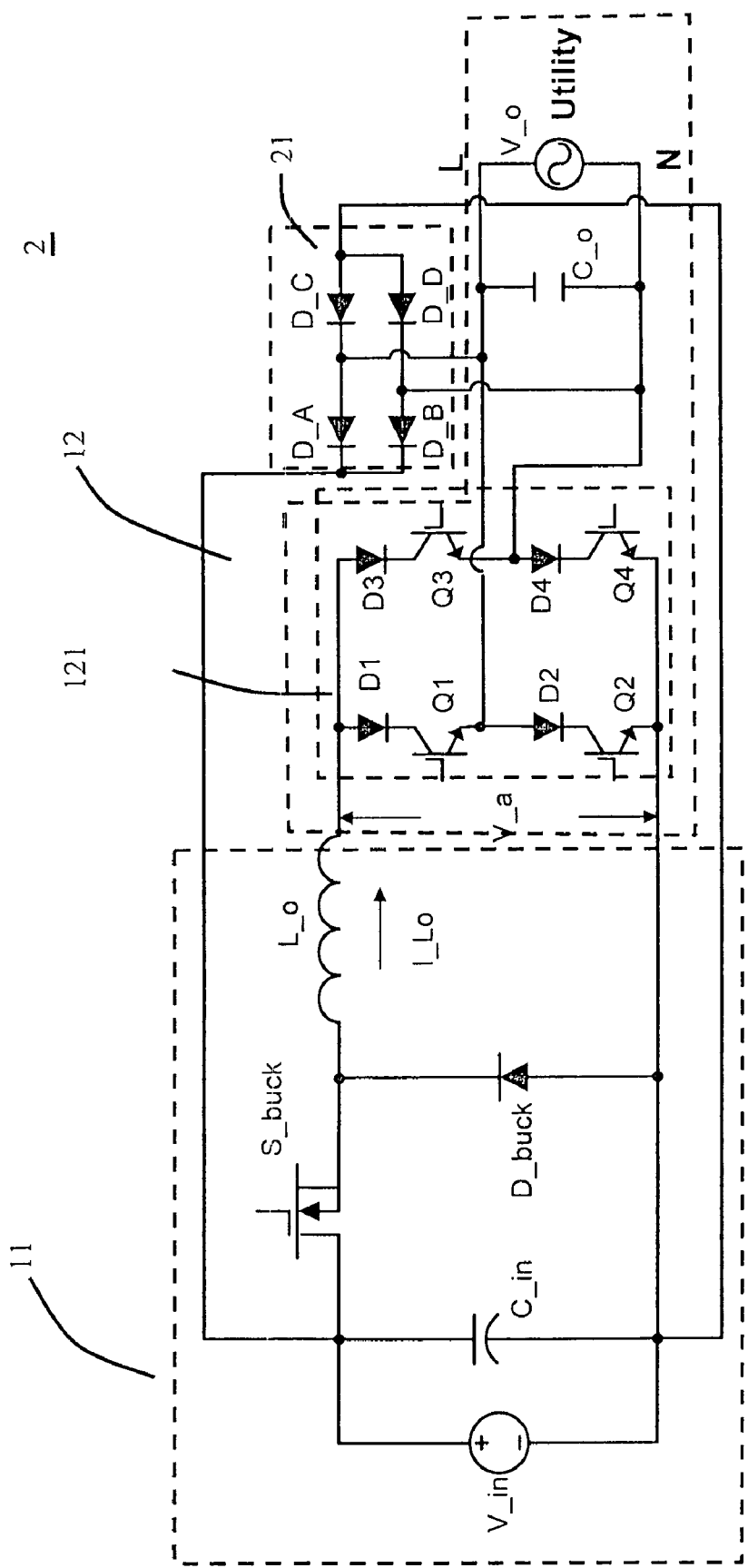
FIG. 3(a) is a schematic circuit diagram of a conventional current source inverter having an energy clamp circuit.
Figure 3B:
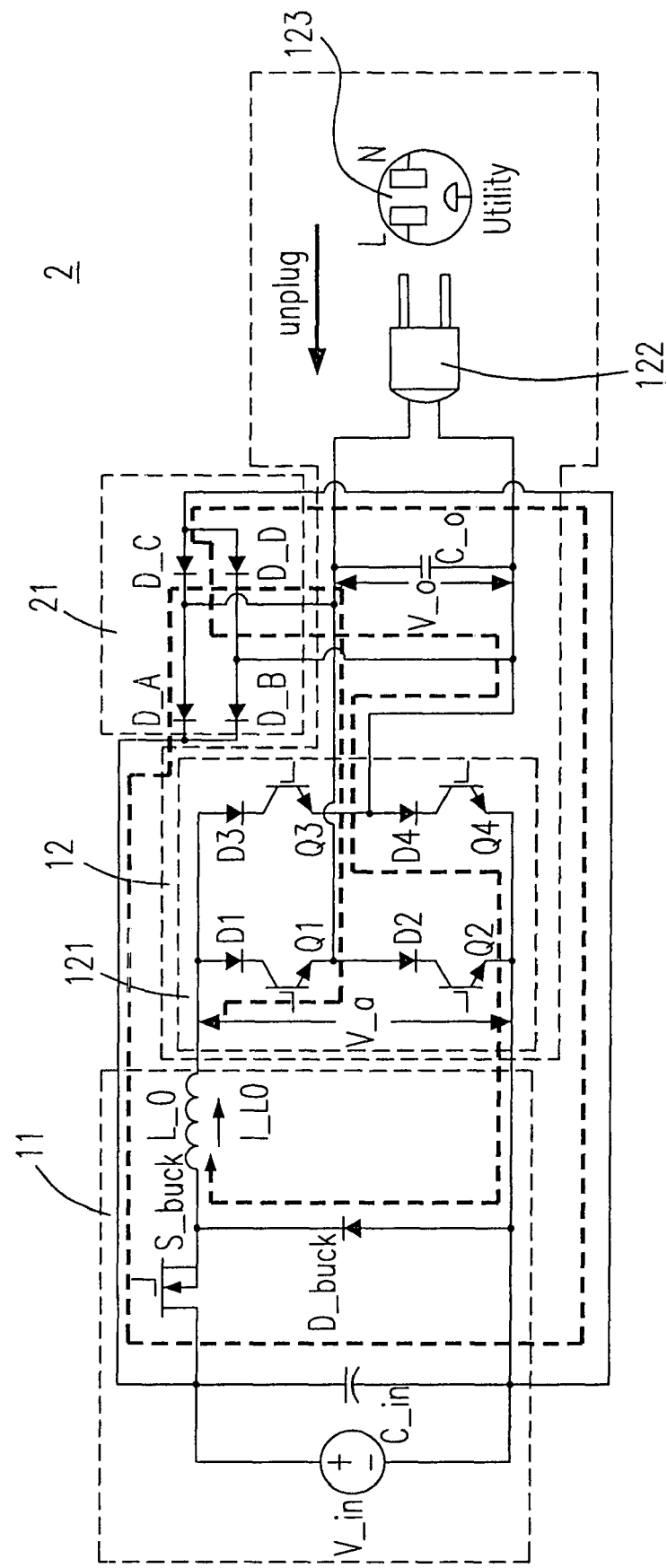
FIG. 3(b) is a schematic circuit diagram of a conventional current source inverter having an energy clamp circuit and a discharging route of the output inductor when the utility power is disconnected with the current source inverter, while the AC output voltage is at a positive half-cycle.
Figure 4B:
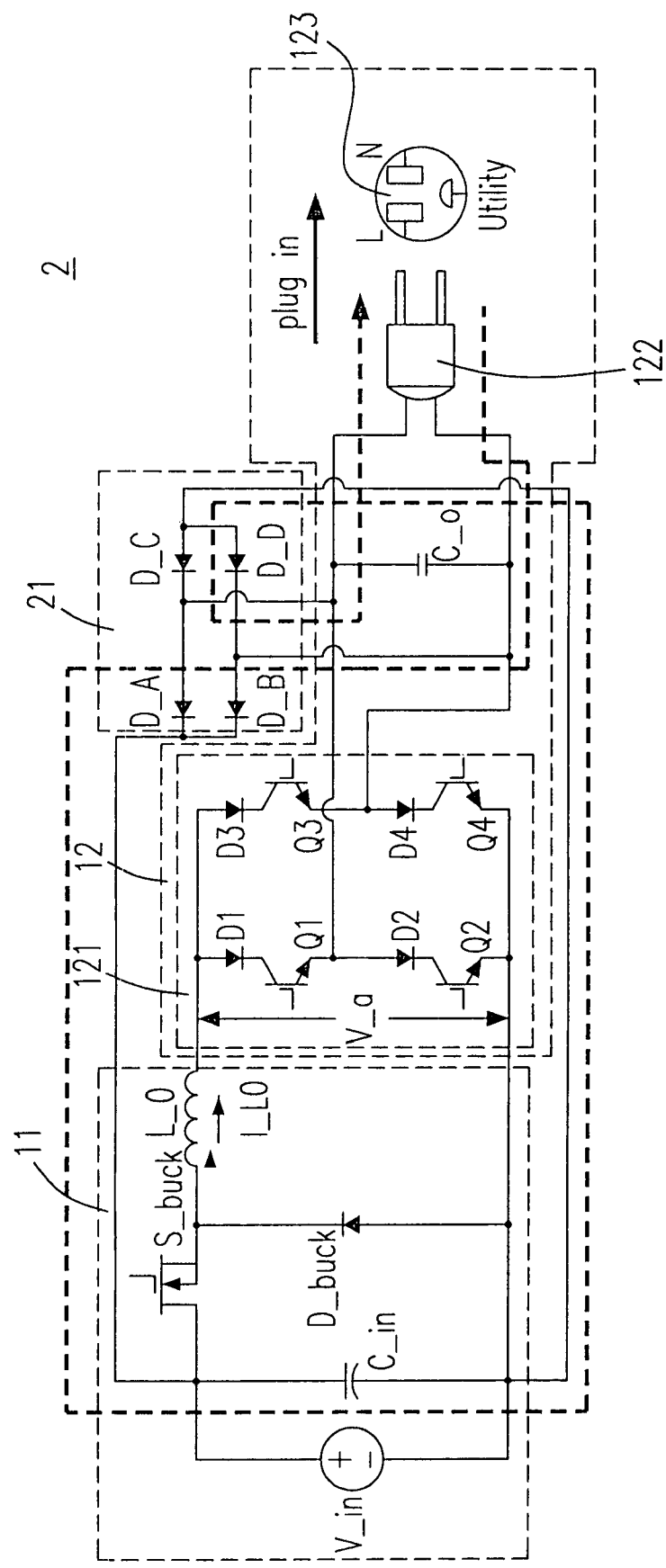
FIG. 4(b) shows a schematic circuit diagram of a conventional current source inverter having an energy clamp circuit and an inrush current route when the utility power is connected with the current source inverter, and the DC input voltage is zero, while the AC output voltage is at a negative half-cycle.

By the same token, the potential negative half-cycle inrush current route is the same as the inrush current route of FIG. 4(b), which is employed to indicate the possible route of the inrush current only if the switch 312 is not turned off timely. The switch 312 is also located at the negative half-cycle inrush current route, and is turned off when the utility power (Utility) is connected with the current source inverter 2, the DC input voltage V_in is at one of the states being zero and being less than a peak value of the AC output voltage V_o of the utility power (Utility), while the AC output voltage is at a negative half-cycle, and turning off the switch 312 timely would totally eliminate the inrush current too. If the utility power (Utility) is disconnected with the current source inverter 5 (the plug 122 is separated from the socket 123), the electrical power stored in the output inductor L_o would be discharged to the output capacitor C_o and the input capacitor C_in. The configuration of the plurality of diodes 311 is the same as that of the energy clamp circuit 21, the operational principles of the plurality of diodes 311 and the positive half-cycle and the negative half-cycle discharging routes of the output inductor L_o are the same as those of the energy clamp circuit 21 as shown in FIGS. 3(a) and 3(b), and would not be described here.

Figure 3C:
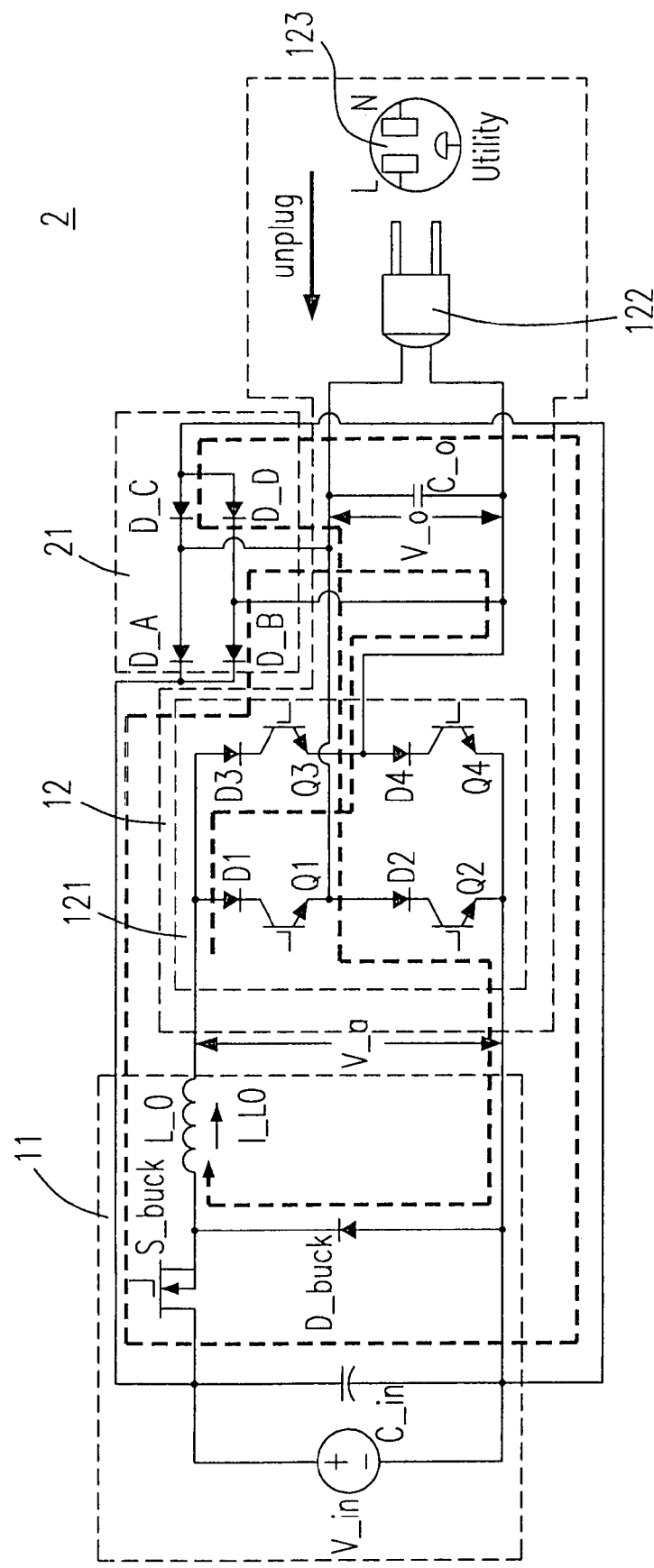
FIG. 3(c) is a schematic circuit diagram of a conventional current source inverter having an energy clamp circuit and a discharging route of the output inductor when the utility power is disconnected with the current source inverter, while the AC output voltage is at a negative half-cycle.
Figure 5B:
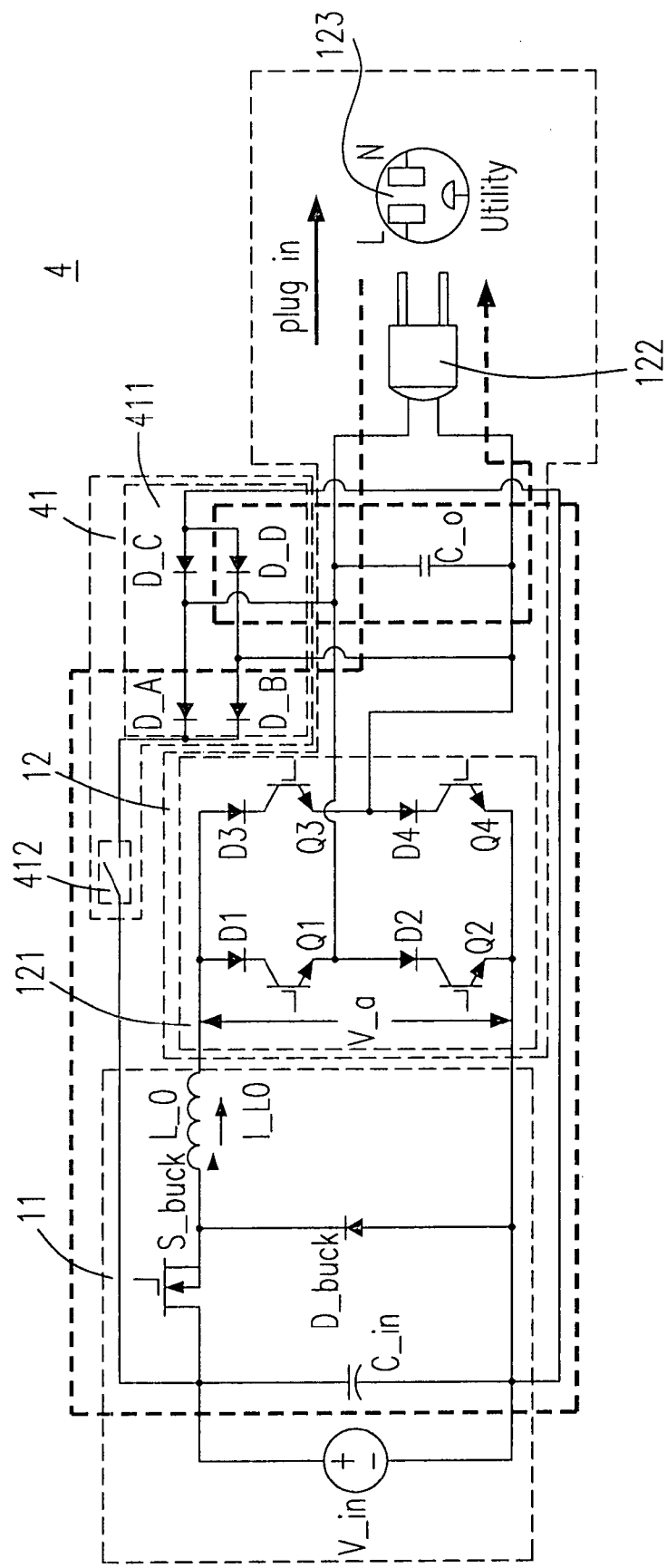
FIG. 5(b) shows a schematic circuit diagram of a current source inverter including an energy clamp circuit having a relatively better effectiveness according to the second preferred embodiment of the present invention and a potential inrush current route when the utility power is connected with the current source inverter, while the AC output voltage is at a positive half-cycle.

Referring to FIG. 5(b), it shows a schematic circuit diagram of a current source inverter including an energy clamp circuit having a relatively better effectiveness according to the second preferred embodiment of the present invention and a potential inrush current route when the utility power is connected with the current source inverter, and the AC output voltage is at the positive half-cycle. In which, the current source inverter 4 includes the buck converter 11, the DC/AC converter 12 having the full bridge switching circuit 121, a plug 122 and a socket 123 (for providing the utility power), which are the same as those of FIGS. 3(a)-3(c), and an energy clamp circuit 41 having a plurality of diodes 411 (the first to the fourth diodes D_A, D_B, D_C and D_D, which are the same as those of 21 in FIG. 3(a)) and a switch 412, which has the same basic configuration as that of FIG. 5(a) except that the switch 412 is connected at a location different from that of the switch 312 of FIG. 5(a). The switch 412 is electrically connected to the cathode of the first diode D_A and the first terminal of the input capacitor C_in in series, is located at the potential positive/negative half-cycle inrush current routes (the potential positive half-cycle inrush current route is shown in FIG. 5(b), and the potential negative half-cycle inrush current route is the same as that of FIG. 4(b)), and is turned off when the utility power (Utility) is connected with the current source inverter 4, the DC input voltage V_in is at one of the states being zero and being less than a peak value of the AC output voltage V_o of the utility power (Utility), while the AC output voltage V_o is at a positive/negative half-cycle respectively. Since the switch 412 is located at the route flowing through by the inrush current, turning off the switch 412 timely would totally eliminate the inrush current. Similarly, the electrical power stored in the output inductor L_o would be discharged to the output capacitor C_o and the input capacitor C_in when the utility power (Utility) is disconnected with the current source inverter 4 (the plug 122 is separated from the socket 123). The configuration of the plurality of diodes 411 is the same as that of the energy clamp circuit 21 as shown in FIG. 3(a), the operational principles of the plurality of diodes 411 and the positive half-cycle and the negative half-cycle discharging routes of the output inductor L_o are the same as those of the energy clamp circuit 21 as shown in FIGS. 3(a) to 3(c), and would not be mentioned here.

Figure 5C:
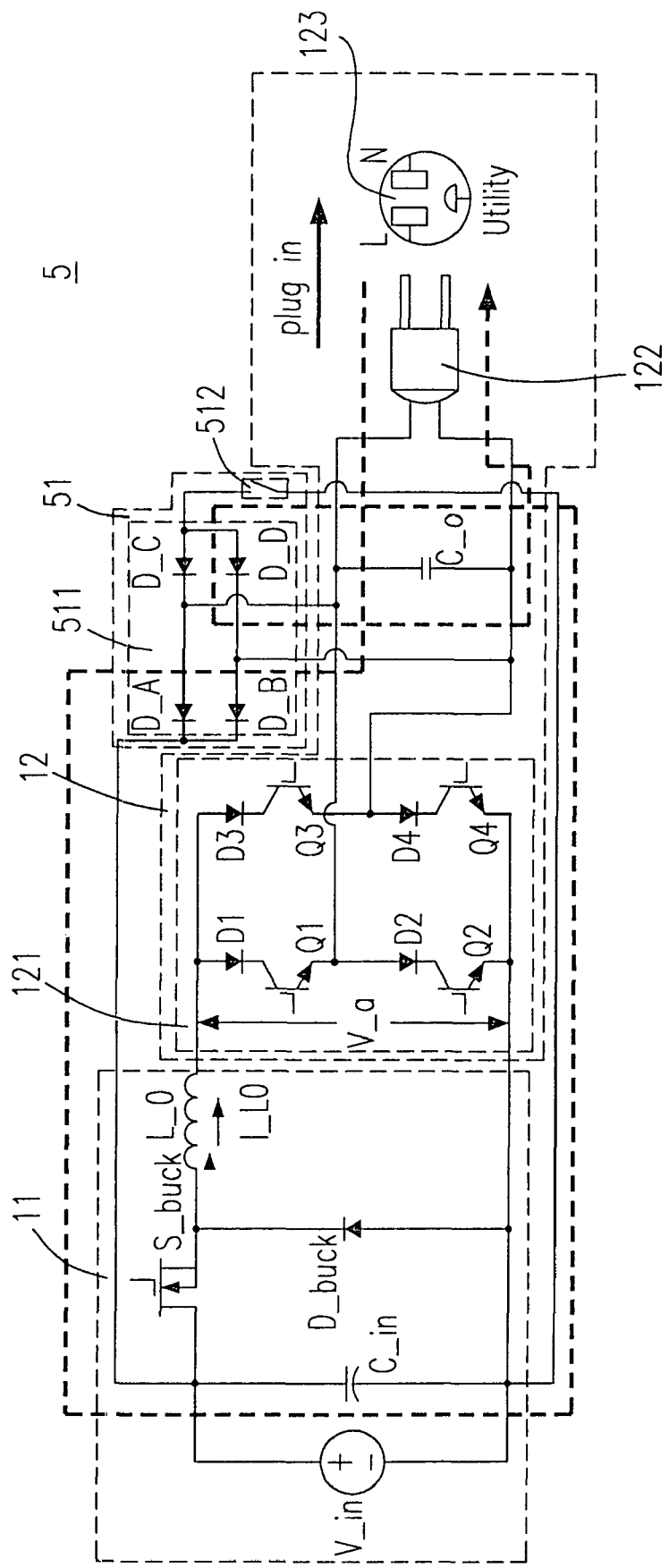
FIG. 5(c) shows a schematic circuit diagram of a current source inverter including an energy clamp circuit having a relatively better effectiveness according to the third preferred embodiment of the present invention and a potential inrush current route when the utility power is connected with the current source inverter, while the AC output voltage is at a positive half-cycle.

Referring to FIG. 5(c), it shows a schematic circuit diagram of a current source inverter including an energy clamp circuit having a relatively better effectiveness according to the third preferred embodiment of the present invention and a potential inrush current route when the utility power is connected with the current source inverter, and the AC output voltage is at the positive half-cycle. In which, the current source inverter 5 includes the buck converter 11, the DC/AC converter 12 having the full bridge switching circuit 121, a plug 122 and a socket 123 (for providing the utility power), which are the same as those of FIGS. 3(a)-3(c), and an energy clamp circuit 51 having a plurality of diodes 511 (the first to the fourth diodes D_A, D_B, D_C and D_D, which are the same as those of 21 in FIG. 3(a)) and a switch 512, which has the same basic configuration as those of FIGS. 5(a) and 5(b) except that the switch 512 is connected at a location different from those of the switches 312 and 412 of FIGS. 5(a) and 5(b) respectively. The switch 512 is electrically connected to the anode of the third diode D_C and the second terminal of the input capacitor C_in in series, is located at the potential positive/negative half-cycle inrush current routes (the potential positive half-cycle inrush current route is shown in FIG. 5(c), and the potential negative half-cycle inrush current route is the same as that of FIG. 4(b)), and is turned off when the utility power (Utility) is connected with the current source inverter 5, the DC input voltage V_in is at one of the states being zero and being less than a peak value of the AC output voltage V_o of the utility power (Utility), while the AC output voltage V_o is at a positive/negative half-cycle respectively. Since the switch 512 is located at the routes flowing through by the inrush current, turning off the switch 512 timely would totally eliminate the inrush current. Similarly, if the utility power (Utility) is disconnected with the current source inverter 5 (the plug 122 is separated from the socket 123), the electrical power stored in the output inductor L_o would be discharged to the output capacitor C_o and the input capacitor C_in. The configuration of the plurality of diodes 511 is the same as that of the energy clamp circuit 21, the operational principles of the plurality of diodes 511 and the positive half-cycle and the negative half-cycle discharging routes of the output inductor L_o are the same as those of the energy clamp circuit 21 as shown in FIGS. 3(*a*) and 3(*b*), and would not be mentioned here.

Figure 6A:
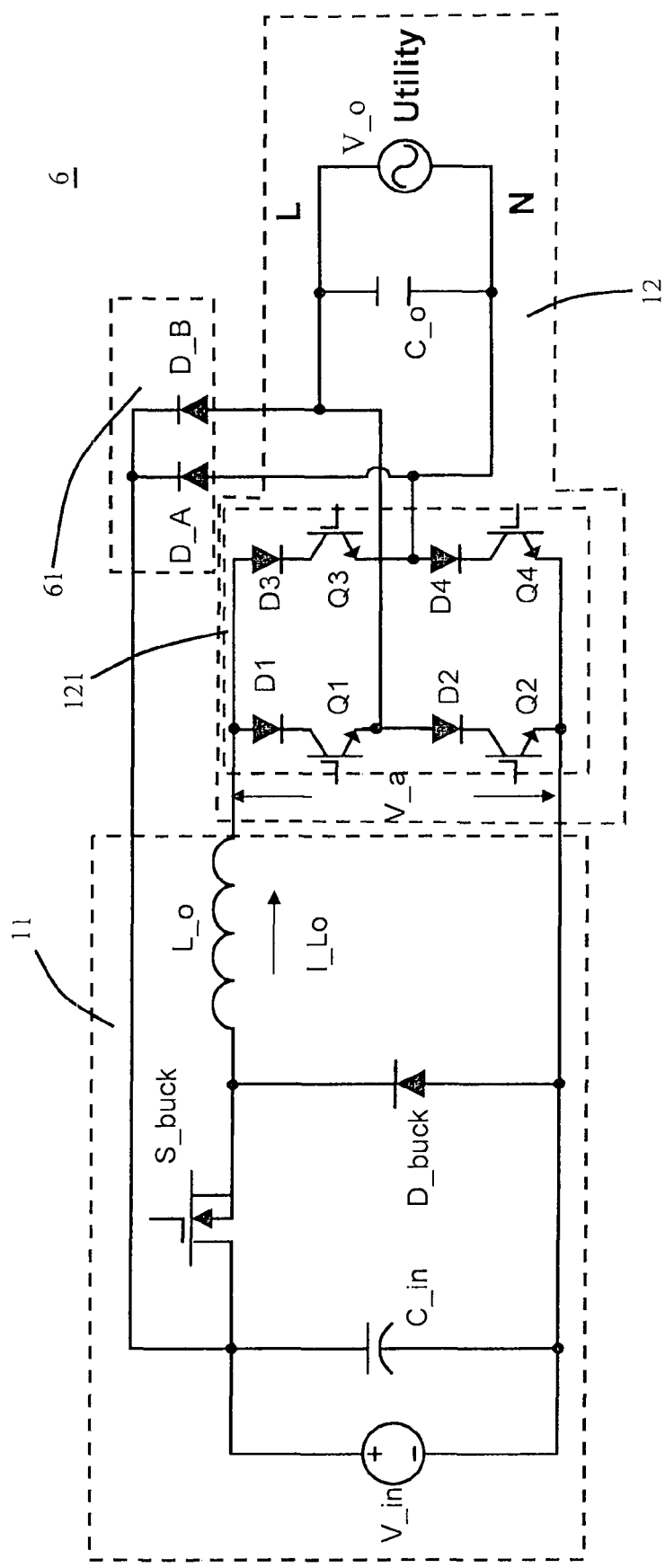
FIG. 6(a) is a schematic circuit diagram of a current source inverter including an energy clamp circuit having a relatively better effectiveness according to the fourth preferred embodiment of the present invention.
Figure 6B:
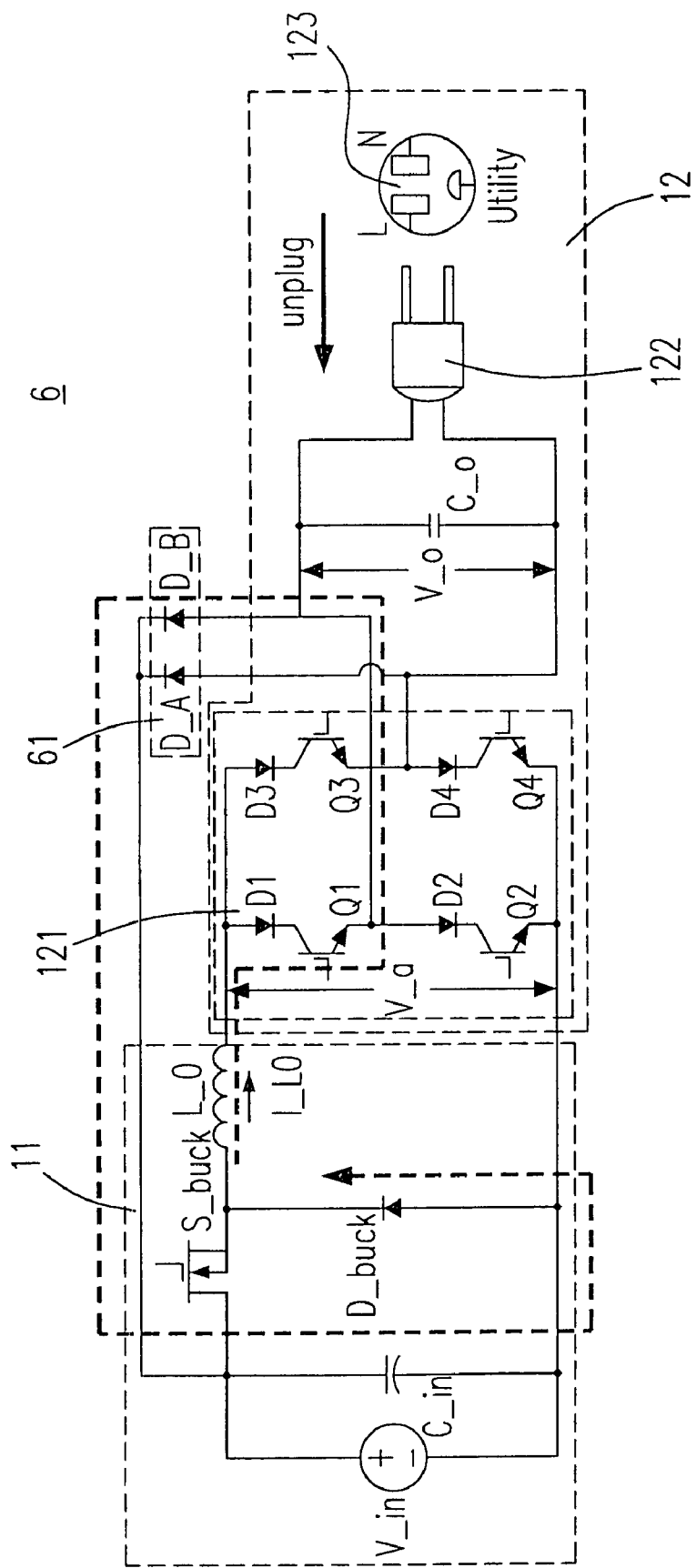
FIG. 6(b) shows a schematic circuit diagram of a current source inverter including an energy clamp circuit having a relatively better effectiveness according to the fourth preferred embodiment of the present invention and a discharging route of the output inductor when the utility power is disconnected with the current source inverter, while the AC output voltage is at a positive half-cycle.
Figure 6C:
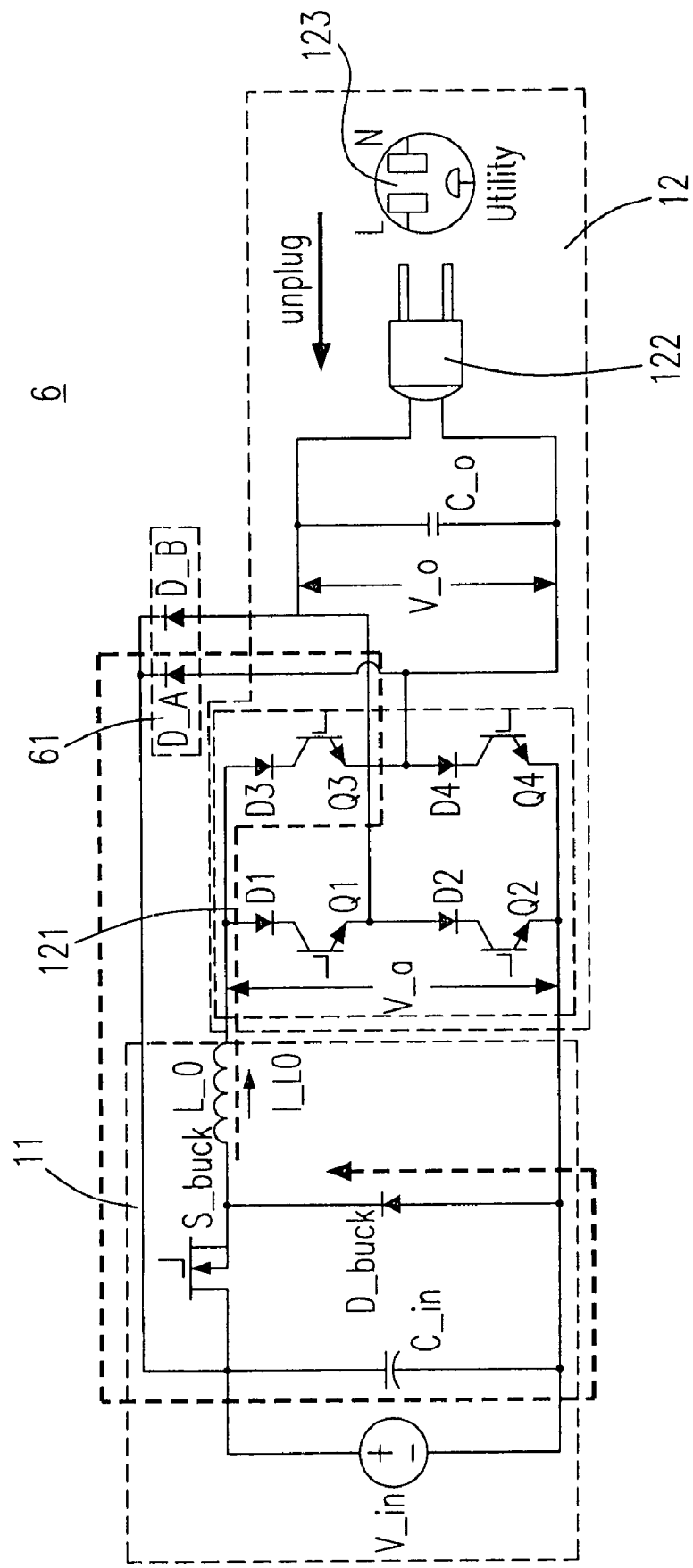
FIG. 6(c) shows a schematic circuit diagram of a current source inverter including an energy clamp circuit having a relatively better effectiveness according to the fourth preferred embodiment of the present invention and a discharging route of the output inductor when the utility power is disconnected with the current source inverter, while the AC output voltage is at a negative half-cycle.

Please refer to FIG. 6(*a*), it shows a schematic circuit diagram of a current source inverter including an energy clamp circuit having a relatively better effectiveness according to the fourth preferred embodiment of the present invention. In which, the relay system 5 includes the buck converter 11, the DC/AC converter 12 having the full bridge switching circuit 121, a plug 122 and a socket 123 (for providing the utility power), which are the same as those of FIGS. 3(*a*)-3(*c*), and an energy clamp circuit 61 having a first and a second diodes (D_A and D_B). The configuration and the operational principles of the buck converter 11 and the DC/AC converter 12 are the same as those of the current source inverter 2 as shown in FIGS. 3(*a*) to 3(*c*), and would not be described here.

As shown in FIGS. 6(*a*) and 6(*b*), the electrical power stored in the output inductor L_o would be feedbacked to the output capacitor C_o when the utility power (Utility) is disconnected with the current source inverter 6, and one of the diode D_A (at the positive half-cycle of the AC output voltage V_o) and the diode D_B (at the negative half-cycle of the AC output voltage V_o) is turned on when the AC output voltage V_o is increased to a value such that the voltage across the output capacitor C_o is a little bit larger than the DC input voltage V_in. At this moment, the output inductor L_o discharges the stored electrical power to the terminals of DC input voltage V_in (i.e. C_in) via the free-wheeling diode D_buck of the buck converter 11 and one of the diode D_A (at the positive half-cycle of the AC output voltage V_o) and the diode D_B (at the negative half-cycle of the AC output voltage V_o). That is to say, when the AC output voltage V_o of the utility power (Utility) is at the positive half-cycle, and the AC output voltage V_o of the utility power (Utility) is disconnected with the current source inverter 6 (the plug 122 is separated from the socket 123), the electrical power stored in the output inductor L_o would be discharged to the output capacitor C_o and the input capacitor C_in via the positive half-cycle discharging route, i.e. the current route as shown in FIG. 6(*b*) (the output inductor L_o→the diode D1→the transistor Q1→the diode D_B→the input capacitor C_in→the free-wheeling diode D_buck→the output inductor L_o). Referring to FIG. 6(*c*), when the AC output voltage V_o of the utility power (Utility) is at the negative half-cycle, and the AC output voltage V_o of the utility power (Utility) is disconnected with the current source inverter 6 (the plug 122 is separated from the socket 123), the electrical power stored in the output inductor L_o would be discharged to the output capacitor C_o and the input capacitor C_in via the negative half-cycle discharging route, i.e. the current route as shown in FIG. 6(*c*) (the output inductor L_o→the diode D3→the transistor Q3→the diode D_A→the input capacitor C_in→the free-wheeling diode D_buck→the output inductor L_o).

As shown in FIGS. 6(*a*) to 6(*c*), the above-mentioned inrush current would not be generated by the current source inverter 6 at one of the states that the DC input voltage is not built up yet and the DC input voltage is less than a peak value of an AC output voltage V_o of the utility power (Utility), while the current source inverter 6 is electrically connected to the utility power (Utility) since all of the transistors Q1 to Q4 are not turned on, and there is no route could be formed for the rush current.

In conclusion, the provided current source inverter including the energy clamp circuit and its controlling method have the advantages that the electrical power stored in the output inductor of the current source inverter would be discharged to the output capacitor and the input capacitor of the current source inverter via the energy clamp circuit such that the voltage stresses of the plurality of transistors of the current source inverter would be decreased dramatically when the AC output voltage of the utility power is disconnected with the current source inverter, and the current source inverter is employed to avoid the inrush current when the DC input voltage of the current source inverter is at one of the states being zero and being less than a peak value of the AC output voltage of the utility power, while the utility power is connected with the current source inverter.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A current source inverter, feedbacking an AC output current to an independent power supply having a load, providing an electrical power to the load, and comprising:
   a buck converter receiving a DC input voltage and generating an inductor current having a rectified sinusoidal waveform;
   a DC/AC converter coupled to the buck converter, receiving the inductor current and providing the AC output current; and
   an energy clamp circuit coupled to the buck converter and the DC/AC converter, and comprising:
      a plurality of diodes coupled to the buck converter and the DC/AC converter; and
      a first switch coupled to one of the buck converter and the DC/AC converter for eliminating an inrush current at one of the states that the DC input voltage is not built up yet and the DC input voltage is less than a peak value of an AC output voltage of the independent power supply, while the current source inverter is electrically connected to the independent power supply.

2. A current source inverter according to claim 1, wherein the plurality of diodes comprise a first to a fourth diodes, and the buck converter comprises:
   an input capacitor having a first and a second terminals;
   an output inductor having a first and a second terminals;
   a second switch having a first terminal coupled to the first terminal of the input capacitor, a second terminal and a control terminal; and a fifth diode having an anode coupled to the second terminal of the input capacitor and a cathode coupled to the second terminal of the second switch and the first terminal of the output inductor, wherein the inductor current is converted into the AC output current via the DC/AC converter coupled to the second terminal of the output inductor and comprising:
an output capacitor having a first and a second terminals and electrically connected to the independent power supply in parallel; and
a full bridge switching circuit having a first input terminal coupled to the second terminal of the output inductor, a second input terminal coupled to the anode of the fifth diode, a first output terminal coupled to the first terminal of the output capacitor and a second output terminal coupled to the second output terminal of the output capacitor for generating the AC output current, and further comprising:
a third switch having a first terminal coupled to the first input terminal of the full bridge switching circuit and a second terminal coupled to the first output terminal of the full bridge switching circuit;
a fourth switch having a first terminal coupled to the first output terminal of the full bridge switching circuit and a second terminal coupled to the second input terminal of the full bridge switching circuit;
a fifth switch having a first terminal coupled to the first terminal of the third switch and a second terminal coupled to the second output terminal of the full bridge switching circuit; and
a sixth switch having a first terminal coupled to the second output terminal of the full bridge switching circuit and a second terminal coupled to the second terminal of the fourth switch,
wherein the energy clamp circuit provides a discharging route when the output capacitor is separated from the independent power supply such that an electrical energy stored in the output inductor is discharging to the output and the input capacitors to decrease a voltage stress of the DC/AC converter, the first to the fourth diodes form the discharging route, each of the first to the fourth diodes has an anode and a cathode, the anode of the first diode is coupled to the first terminal of the output capacitor, the cathode of the first diode is coupled to the first terminal of the input capacitor, the anode of the second diode is coupled to the second terminal of the output capacitor, the cathode of the second diode is coupled to the cathode of the first diode, the anode of the third diode is coupled to the second terminal of the input capacitor, the cathode of the third diode is coupled to the anode of the first diode, the anode of the fourth diode is coupled to the anode of the third diode, and the cathode of the fourth diode is coupled to the anode of the second diode.

3. A current source inverter according to claim 2, wherein the fifth diode is a free-wheeling diode, the second switch is a buck converter switch, and the third to the sixth switches are a first to a fourth unidirectional switches each having a first and a second ends, and further comprising:
a rectifying diode having an anode coupled to the first end and a cathode; and
a power transistor having a first terminal coupled to the cathode of the rectifying diode, a second terminal coupled to the second end, and a control terminal, wherein the voltage stress is a voltage stress of the power transistor, and the power transistor is one selected from a group consisting of a MOSFET, an IGBT, and a bipolar transistor.

4. A current source inverter according to claim 2, wherein the first switch is electrically connected to two terminals, being one set selected from a set group consisting of the cathode of the third diode and the first terminal of the output capacitor, the cathode of the first diode and the first terminal of the input capacitor, and the anode of the third diode and the second terminal of the input capacitor, in series, the independent power supply is one selected from a group consisting of a utility power, a generator and an UPS, the independent power supply has a first terminal and a second terminal, a route of the inrush current comprises a positive half-cycle route and a negative half-cycle route, the positive half-cycle route comprises the first terminal of the independent power supply, the first terminal of the output capacitor, the first diode, the input capacitor, the fourth diode, the second terminal of the output capacitor and the second terminal of the independent power supply so as to form a first loop when the AC output voltage is at a positive half-cycle, the negative half-cycle route comprises the second terminal of the independent power supply, the second terminal of the output capacitor, the second diode, the input capacitor, the third diode, the first terminal of the output capacitor and the first terminal of the independent power supply so as to form a second loop when the AC output voltage is at a negative half-cycle, and the first switch is turned off to disconnect one of the first loop and the second loop so as to eliminate the inrush current.

5. A current source inverter according to claim 2, wherein the first switch is electrically connected to two terminals, being one set selected from a set group consisting of the cathode of the third diode and the first terminal of the output capacitor, the cathode of the first diode and the first terminal of the input capacitor, and the anode of the third diode and the second terminal of the input capacitor, in series, the discharging route comprises a positive half-cycle discharging route and a negative half-cycle discharging route, the positive half-cycle discharging route comprises the output inductor, the third switch, the first diode, the input capacitor, the fourth diode, the sixth switch and the fifth diode to form a first loop, the negative half-cycle discharging route comprises the output inductor, the fifth switch, the second diode, the input capacitor, the third diode, the fourth switch and the fifth diode to form a second loop, the electrical power stored in the output inductor is discharged to the input capacitor via the first loop when the output capacitor and the independent power supply are separated at a positive half-cycle of the AC output voltage, the electrical energy stored in the output inductor is discharged to the input capacitor via the second loop when the output capacitor and the independent power supply are separated at a negative half-cycle of the AC output voltage, and the independent power supply belongs to one of the two states, being that the power supply is connected to and separated from the output capacitor via causing one of a connection and a separation of a socket coupled to the power supply and a plug respectively.

6. A current source inverter according to claim 2, wherein the output inductor current would have a sinusoidal waveshape in phase with the output AC line voltage such that a power factor of the current source inverter is one.

7. A current source inverter, feedbacking an AC output current to an independent power supply having a load, providing an electrical power to the load, and comprising:
a buck converter receiving a DC input voltage and generating an inductor current having a rectified sinusoidal waveform;

a DC/AC converter coupled to the buck converter, receiving the inductor current and providing the AC output current; and an energy clamp circuit coupled to the buck converter and the DC/AC converter for eliminating an inrush current at one of the states that the DC input voltage is not built up yet and the DC input voltage is less than a peak value of an AC output voltage of the independent power supply, while the current source inverter is electrically connected to the independent power supply, and comprising:

a first diode coupled to the buck converter and the DC/AC converter; and a second diode coupled to the first diode, wherein the buck and the DC/AC converters are the buck and the DC/AC converters as claimed in claim 3, the energy clamping circuit provides a discharging route when the output capacitor is separated from the independent power supply such that an electrical energy stored in the output inductor is discharging to the output and the input capacitors to decrease a voltage stress of the DC/AC converter, the first and the second diodes form a discharging route, each of the first and the second diodes has an anode and a cathode, the anode of the first diode is coupled to the second terminal of the output capacitor, the cathode of the first diode is coupled to the first terminal of the input capacitor, the anode of the second diode is coupled to the first terminal of the output capacitor, the cathode of the second diode is coupled to the cathode of the first diode, and the inrush current is not generated by the current source inverter at one of the states that the DC input voltage is not built up yet and the DC input voltage is less than a peak value of the AC output voltage of the independent power supply, while the current source inverter is electrically connected to the independent power supply since the first to the fourth unidirectional switches are not turned on.

8. A current source inverter according to claim 7, wherein the discharging route comprises a positive half-cycle discharging route and a negative half-cycle discharging route, the positive half-cycle discharging route comprises the output inductor, the first unidirectional switch, the second diode, the input capacitor and the free-wheeling diode to form a first loop, the negative half-cycle discharging route comprises the output inductor, the third unidirectional switch, the first diode, the input capacitor and the free-wheeling diode to form a second loop, the electrical power stored in the output inductor is discharged to the input capacitor via the first loop when the load is disconnected with the output capacitor at a positive half-cycle of the AC output voltage, and the electrical energy stored in the output inductor is discharged to the input capacitor via the second loop when the load is disconnected with the output capacitor at a negative half-cycle of the AC output voltage.

9. A controlling method of a current source inverter, wherein the current source inverter comprises an input capacitor, an output inductor, an output capacitor electrically connected in parallel to an independent power supply having a load, and an energy clamp circuit coupled to the input and the output capacitors, comprising the steps of:

(a) causing the current source inverter to receive a DC input voltage and to generate an inductor current having a rectified sinusoidal waveform;

(b) causing the current source inverter to receive the inductor current, feedback an AC output current to the independent power supply and provide an electrical power to the load;

(c) causing the energy clamp circuit to provide a discharging route when the output capacitor is separated from the independent power supply such that the electrical energy stored in the output inductor is discharging to the output and the input capacitors to decrease a voltage stress of the current source inverter; and (d) causing the energy clamp circuit to eliminate an inrush current at one of the states that the DC input voltage is not built up yet and the DC input voltage is less than a peak value of an AC output voltage of the independent power supply, while the current source inverter is electrically connected to the independent power supply, wherein the energy clamp circuit is the energy clamp circuit as claimed in claim 1.

10. A current source inverter, comprising:

a main circuit receiving a DC input voltage and providing an AC output current; and an energy clamp circuit coupled to the main circuit, and comprising:

a plurality of diodes coupled to the main circuit; and a first switch coupled to the main circuit for eliminating an inrush current at one of the states that the DC input voltage is not built up yet and the DC input voltage is less than a peak value of an AC output voltage of an independent power supply, wherein the current source inverter feedbacks the AC output current to the independent power supply having a load and provides an electrical power to the load, and the first switch eliminates the inrush current while the current source inverter is electrically connected to the independent power supply, and the main circuit comprises a buck and a DC/AC converters as claimed in claim 1.

11. An energy clamp circuit adapted to a main circuit to form a current source inverter, comprising:

a plurality of diodes coupled to the main circuit; and a first switch coupled to the main circuit for eliminating an inrush current at one of the states that a DC input voltage is not built up yet and the DC input voltage is less than a peak value of an AC output voltage of an independent power supply, further comprising a main circuit as claimed in claim 10 to form a current source inverter.

12. A current source inverter, feedbacking an AC output current to an independent power supply having a load, providing an electrical power to the load, and comprising:

a buck converter receiving a DC input voltage and generating an inductor current having a rectified sinusoidal waveform;

a DC/AC converter coupled to the buck converter, receiving the inductor current and providing the AC output current; and an energy clamp circuit coupled to the buck converter and the DC/AC converter for eliminating an inrush current at one of the states that the DC input voltage is not built up yet and the DC input voltage is less than a peak value of an AC output voltage of the independent power supply, while the current source inverter is electrically connected to the independent power supply, and comprising:

a first diode coupled to the buck converter and the DC/AC converter; and a second diode coupled to the first diode.

13. A controlling method of a current source inverter, wherein the current source inverter comprises an input capacitor, an output inductor, an output capacitor electrically connected in parallel to an independent power supply having a load, and an energy clamp circuit coupled to the input and the output capacitors, comprising the steps of:
- (a) causing the current source inverter to receive a DC input voltage and to generate an inductor current having a rectified sinusoidal waveform;
- (b) causing the current source inverter to receive the inductor current, feedback an AC output current to the independent power supply and provide an electrical power to the load;
- (c) causing the energy clamp circuit to provide a discharging route when the output capacitor is separated from the independent power supply such that the electrical energy stored in the output inductor is discharging to the output and the input capacitors to decrease a voltage stress of the current source inverter; and
- (d) causing the energy clamp circuit to eliminate an inrush current at one of the states that the DC input voltage is not built up yet and the DC input voltage is less than a peak value of an AC output voltage of the independent power supply, while the current source inverter is electrically connected to the independent power supply, wherein the energy clamp circuit is the energy clamp circuit as claimed in claim 12.

14. A current source inverter, comprising:
a main circuit receiving a DC input voltage and providing an AC output current; and
an energy clamp circuit coupled to the main circuit, and comprising:
  a first diode coupled to the main circuit; and
  a second diode coupled to the first diode for eliminating an inrush current at one of the states that the DC input voltage is not built up yet and the DC input voltage is less than a peak value of an AC output voltage of an independent power supply, wherein the current source inverter feedbacks the AC output current to the independent power supply having a load and provides an electrical power to the load, the main circuit comprises a buck and a DC/AC converters as claimed in claim 12, and the first switch eliminates the inrush current while the current source inverter is electrically connected to the independent power supply.

15. An energy clamp circuit adapted to a main circuit to form a current source inverter eliminating an inrush current at one of the states that a DC input voltage is not built up yet and the DC input voltage is less than a peak value of an AC output voltage of an independent power supply, and comprising:
a first p-n junction coupled to the main circuit; and
a second p-n junction coupled to the first p-n junction, further comprising a main circuit as claimed in claim 14 to form a current source inverter, wherein the first and the second p-n junctions are a first and a second diodes.

16. A controlling method of a current source inverter, wherein the current source inverter comprises an input capacitor, an output inductor, an output capacitor electrically connected in parallel to an independent power supply having a load, and an energy clamp circuit coupled to the input and the output capacitors, comprising the steps of:
- (a) causing the current source inverter to receive a DC input voltage and to generate an inductor current having a rectified sinusoidal waveform;
- (b) causing the current source inverter to receive the inductor current, feedback an AC output current to the independent power supply and provide an electrical power to the load;
- (c) causing the energy clamp circuit to provide a discharging route when the output capacitor is separated from the independent power supply such that the electrical energy stored in the output inductor is discharging to the output and the input capacitors to decrease a voltage stress of the current source inverter; and
- (d) causing the energy clamp circuit to eliminate an inrush current at one of the states that the DC input voltage is not built up yet and the DC input voltage is less than a peak value of an AC output voltage of the independent power supply, while the current source inverter is electrically connected to the independent power supply.

* * * * *